United States Patent
Komori et al.

(10) Patent No.: US 6,777,129 B2
(45) Date of Patent: Aug. 17, 2004

(54) ALKALINE STORAGE BATTERY

(75) Inventors: Katsunori Komori, Aichi (JP); Naoto Sato, Shizuoka (JP); Akihiro Taniguchi, Aichi (JP); Munehisa Ikoma, Aichi (JP); Yasuhiro Takahashi, Aichi (JP); Takashi Ito, Aichi (JP)

(73) Assignees: Matsushita Electric Industrial Co., Ltd., Osaka (JP); Tokyo Jidosha Kabushiki Kaisha, Aichi (JP)

( * ) Notice: Subject to any disclaimer, the term of this patent is extended or adjusted under 35 U.S.C. 154(b) by 126 days.

(21) Appl. No.: 09/841,646

(22) Filed: Apr. 24, 2001

(65) Prior Publication Data

US 2002/0025472 A1 Feb. 28, 2002

(30) Foreign Application Priority Data

Apr. 27, 2000 (JP) ........................ 2000-127377

(51) Int. Cl.[7] .......... H01M 2/36; H01M 2/16; H01M 4/58; H01M 10/24; H01M 2/18
(52) U.S. Cl. .............. 429/118; 429/131; 429/136; 429/218.2; 429/247; 429/250; 429/254
(58) Field of Search ................ 429/127, 131, 429/133, 136, 118, 250, 254, 218.2, 247

(56) References Cited

U.S. PATENT DOCUMENTS

| | | | | |
|---|---|---|---|---|
| 4,137,379 A | * | 1/1979 | Schmidt et al. .......... | 429/254 |
| 4,378,414 A | * | 3/1983 | Furukawa et al. ........ | 429/144 |
| 5,032,475 A | * | 7/1991 | Hasebe et al. .......... | 429/60 |

FOREIGN PATENT DOCUMENTS

| | | | | |
|---|---|---|---|---|
| EP | 0 271 043 | 12/1987 | | |
| EP | 0 599 137 | 11/1993 | | |
| EP | 0 644 604 | 1/1994 | | |
| EP | 0 657 952 | 6/1994 | | |
| EP | 0 776 057 | 11/1995 | | |
| EP | 0 834 951 | 6/1997 | | |
| JP | 52097131 A | * | 8/1977 | .......... H01M/2/14 |
| JP | 60-250558 | 12/1985 | | |
| JP | 62-43064 | 2/1987 | | |
| JP | 62-80961 | 4/1987 | | |
| JP | 63-175339 | 7/1988 | | |
| JP | 64-57568 | 3/1989 | | |
| JP | 5-121061 | 5/1993 | | |
| JP | 6-150963 | 5/1994 | | |
| JP | 7-85847 | 3/1995 | | |
| JP | 07099050 A | * | 4/1995 | .......... H01M/2/36 |
| JP | 7-161377 | 6/1995 | | |
| JP | 7-320775 | 12/1995 | | |
| JP | 8-241712 | 9/1996 | | |
| JP | 10-106618 | 4/1998 | | |

* cited by examiner

*Primary Examiner*—Gregg Cantelmo
(74) *Attorney, Agent, or Firm*—Merchant & Gould P.C.

(57) ABSTRACT

An alkaline storage battery having excellent self-discharge characteristics even after a number of charge-discharge cycles is provided. The alkaline storage battery is provided with a case and an electrode group enclosed in the case, and a separator that is included in the electrode group retains at least 15 mg/cm$^2$ of an electrolyte at least in a period after assembling the battery, from the time the separator is impregnated with the electrolyte to the time the battery is activated.

12 Claims, 3 Drawing Sheets

ALKALINE STORAGE BATTERY

BACKGROUND OF THE INVENTION

1. Field of the Invention

The present invention relates to alkaline storage batteries. It relates, for example, to nickel metal-hydride batteries using a hydrogen absorbing alloy.

2. Description of Related Art

In recent years, alkaline storage batteries have attracted wide attention as power sources of portable equipment, cellular phones or the like and those of electric cars, hybrid electric vehicles or the like. Accordingly, higher performance of the alkaline storage batteries has been requested. In particular, nickel metal-hydride batteries rapidly have become widespread as a secondary battery with a high energy density and an excellent reliability. The nickel metal-hydride batteries include a positive electrode using an active material mainly containing nickel hydroxide and a negative electrode using a hydrogen absorbing alloy as the main material.

In the nickel metal-hydride batteries mentioned above, cobalt is added to the positive electrode in order to raise the electric conductivity of the active material. For an active material for the negative electrode, the hydrogen absorbing alloy containing cobalt generally is used. The positive electrode and the negative electrode are insulated by a separator made of nonwoven fabric.

However, the nickel metal-hydride batteries described above have had a problem that self-discharge characteristics deteriorate after charge-discharge cycles are repeated. The inventors carried out an examination and newly found that metal ions eluted from the positive electrode and the negative electrode are deposited on the separator and form a conductive path, causing the deterioration of the self-discharge characteristics. Furthermore, this phenomenon was examined more in detail to find that (1) when the separator retains a sufficient amount of electrolyte, the metal ion such as cobalt that has been eluted into the electrolyte is deposited on the positive electrode, whereas (2) when the electrolyte retained in the separator decreases, the metal ion that has been eluted into the electrolyte is more likely to be deposited on the separator. Accordingly, the reason why the self-discharge characteristics deteriorate after many charge-discharge cycles is considered to be because the decrease in the electrolyte retained in the separator leads to a formation of the conductive path on the separator.

SUMMARY OF THE INVENTION

With the foregoing in mind, it is an object of the present invention to provide an alkaline storage battery that has excellent self-discharge characteristics even after a number of charge-discharge cycles.

In order to achieve the object mentioned above, a first alkaline storage battery of the present invention includes a case, and a positive electrode, a negative electrode, a separator and an electrolyte that are provided in the case. An amount of the electrolyte retained in the separator is equal to or more than 15 mg/cm$^2$ (that is, equal to or more than 15 mg per cm$^2$ of the separator) at least in a period P (that is, in a period after assembling the battery, from the time the separator is impregnated with the electrolyte to the time the battery is activated). In the above-described first alkaline storage battery, since a large amount of the electrolyte is retained in the separator, the electrolyte is not exhausted in the separator even when the charge-discharge cycles are repeated. Thus, according to the above-described first alkaline storage battery, the deposition of a conductive material on a surface of the separator can be prevented, making it possible to obtain the alkaline storage battery that has excellent self-discharge characteristics even after a number of charge-discharge cycles.

Also, a second alkaline storage battery of the present invention includes a case, and a positive electrode, a negative electrode, a separator and an electrolyte that are provided in the case. A total area X (cm$^2$) of the separator and an amount Y (mg) of the electrolyte satisfy a relationship of Y/X>20 at least in a period, after assembling the battery, from the time the separator is impregnated with the electrolyte to that the battery is activated. In the above-described second alkaline storage battery, since there is a large amount of the electrolyte, the electrolyte is not exhausted in the separator even when the charge-discharge cycles are repeated. Thus, according to the above-described second alkaline storage battery, it is possible to obtain an alkaline storage battery that has excellent self-discharge characteristics even after a number of charge-discharge cycles.

In the first and second alkaline storage batteries described above, the separator is formed of sulfonated polypropylene, and sulfur atoms and carbon atoms in the separator may satisfy a relationship of (the number of the sulfur atoms)/(the number of the carbon atoms)=A, where $2.0 \times 10^{-3} \leq A \leq 5.5 \times 10^{-3}$. With the above structure, since an electrolyte retention of the separator becomes particularly high, it is possible to obtain an alkaline storage battery that has even better self-discharge characteristics after charge-discharge cycles.

In the first and second alkaline storage batteries described above, the electrolyte may be poured into the case in a vacuum atmosphere. This pouring method is referred to as a vacuum pouring method in this specification. With the above structure, since a larger amount of the electrolyte is retained in the separator in a uniform manner, it is possible to obtain an alkaline storage battery that has even better self-discharge characteristics. The vacuum pouring method includes (1) a method of pouring the electrolyte into the battery in which air has been removed from the space between fibers of the separator by evacuating a battery case in advance, and (2) a method of pouring the electrolyte into the battery case, then removing air present between fibers of the separator by creating a vacuum in an atmosphere in which the battery case is placed, so that the separator is impregnated sufficiently with the electrolyte upon exposure to the atmosphere.

In the first and second alkaline storage batteries described above, the separator may have a specific surface area ranging from 0.6 m$^2$/g to 0.9 m$^2$/g.

In the first and second alkaline storage batteries described above, the separator may have a median pore diameter on a volume basis of not larger than 30 μm when pores are measured in a range of 0.1 μm to 360 μm with a mercury porosimeter. Also, in the first and second alkaline storage batteries described above, the separator may have a weight per unit area ranging from 60 g/m$^2$ to 85 g/m$^2$. With the above structure, since a path between the positive electrode and the negative electrode that is formed of the fibers of the separator becomes longer, it is possible to prevent a conductive deposit from forming a conductive path continuing from the positive electrode to the negative electrode.

Furthermore, a third alkaline storage battery of the present invention includes a case, and a positive electrode, a negative electrode, a separator and an electrolyte that are provided in the case. A chemical compound containing manganese is deposited on a surface of the separator. In the third alkaline storage battery described above, when cobalt is deposited on the surface of the separator, the cobalt forms a chemical compound with manganese so as to form a deposit with a low electric conductivity. Thus, it is possible to obtain an alkaline storage battery that has excellent self-discharge characteristics even after charge-discharge cycles.

In the third alkaline storage battery described above, the negative electrode may contain a hydrogen absorbing alloy as a main component, and the hydrogen absorbing alloy may contain misch metal and manganese in a composition ratio of 1:B, where $0.2 \leq B \leq 0.5$. With the above structure, since the deposition of a highly conductive material such as cobalt oxyhydroxide on the surface of the separator can be prevented, it is possible to obtain an alkaline storage battery that has excellent self-discharge characteristics after a number of charge-discharge cycles.

In the third alkaline storage battery described above, the electrolyte may contain a manganese ion. With the above structure, since the deposition of a highly conductive material such as cobalt oxyhydroxide on the surface of the separator can be prevented, it is possible to obtain an alkaline storage battery that has excellent self-discharge characteristics after a number of charge-discharge cycles.

DESCRIPTION OF THE PREFERRED EMBODIMENTS

The following is a description of embodiments of the present invention, with reference to the accompanying drawings. The following embodiments simply are examples and do not limit the present invention. For example, although rectangular alkaline storage batteries are discussed in the following embodiments, the alkaline storage battery of the present invention is not limited to the rectangular shape, but may have other shapes such as a cylindrical shape.

First Embodiment

Figure 1:
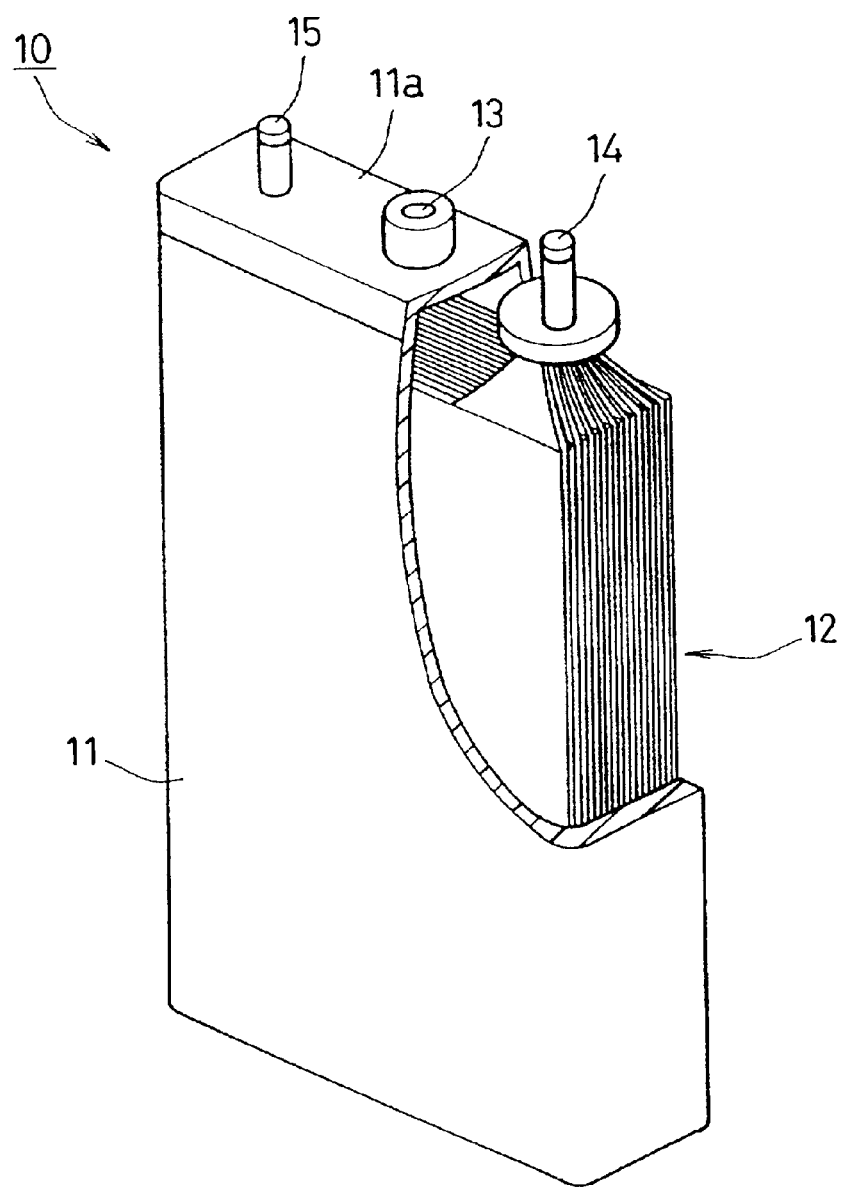
FIG. 1 is a partially exploded perspective view showing an example of an alkaline storage battery of the present invention.

In the first embodiment, a rectangular battery will be described as an example of the alkaline storage battery of the present invention. FIG. 1 is a partially exploded perspective view of an alkaline storage battery 10 of the first embodiment.

Referring to FIG. 1, the alkaline storage battery 10 includes a case 11 provided with a lid 11a, an electrode group 12 and an electrolyte (not shown in the figure) that are enclosed in the case 11, a safety valve 13 provided in the lid 11a, and a positive electrode terminal 14 and a negative electrode terminal 15.

Figure 2:
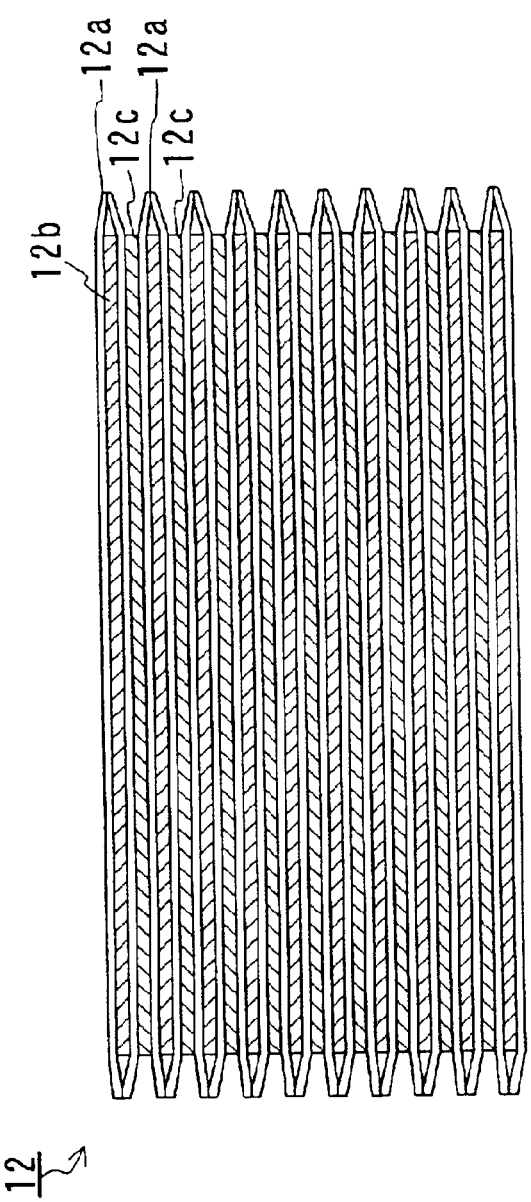
FIG. 2 is a partially sectional view showing the alkaline storage battery shown in FIG. 1.

FIG. 2 is a cross-sectional view of the electrode group 12 taken along a direction parallel to the lid 11a. In FIG. 2, the electrode group 12 includes bag-like separators 12a (hatching is omitted), positive electrodes 12b and negative electrodes 12c. A plurality of the positive electrodes 12b inserted in the separators 12a and a plurality of the negative electrodes 12c are layered one on the other.

The positive electrode 12b in the electrode group 12 includes a support and an active material supported by the support. The support also serves as a collector. As the support, a porous metal body such as a nickel foam or a perforated steel sheet can be used, for example. As the active material for the positive electrode, an active material containing nickel hydroxide and cobalt can be used, for example.

For the electrolyte in the alkaline storage battery 10, electrolytes that generally are used for alkaline storage batteries can be used. For example, an alkaline solution containing KOH with a specific gravity of 1.2 to 1.4 can be used.

The alkaline storage battery 10 preferably contains at least 20 mg of the electrolyte per $cm^2$ of the separator, and more preferably contains at least 25 mg of the electrolyte per $cm^2$ of the separator. In the alkaline storage battery 10, the use of a vacuum filling method can increase an amount of the electrolyte retained in the separator and allows the separator to retain the electrolyte in a substantially uniform manner.

For the separator 12a, nonwoven fabric formed of synthetic fiber treated to be hydrophilic can be used. More specifically, polyolefin nonwoven fabric or ethylene vinyl alcohol copolymer nonwoven fabric treated to be hydrophilic by sulfonation or by application of a surface active agent can be used as the separator 12a. It is particularly preferable that sulfonated polypropylene nonwoven fabric is used as the separator 12a. Also, it is particularly preferable that, in the separator 12a, (the number of sulfur atoms)/(the number of carbon atoms)=A, where $2.0 \times 10^{-3} \leq A \leq 5.5 \times 10^3$. The separator 12a retains at least 15 mg/$cm^2$ (that is, at least 15 mg per $cm^2$ of the separator) of the electrolyte at least in a period after assembling the battery, from the time the separator is impregnated with the electrolyte to the time the battery is activated (hereinafter, also referred to as a period P). Furthermore, it is preferable that the separator 12a retains 18 mg/$cm^2$ to 25 mg/$cm^2$ of the electrolyte in the period P.

It also is preferable that a separator formed of a dense fabric is used for the separator 12a. The use of such separator can extend a path from the positive electrode to the negative electrode, thereby suppressing the formation of the conductive path that continues from the positive electrode to the negative electrode even when a conductive material is deposited on the separator. More specifically, it is preferable that the separator 12a has a specific surface area of 0.6 $m^2$/g to 0.9 $m^2$/g. It also is preferable that the separator 12a has a median pore diameter on a volume basis of not larger than 30 µm when the pores were measured in the range of 0.1 µm to 360 µm with a mercury porosimeter. Furthermore, it is preferable that the separator 12a has a weight per unit area of 60 g/$m^2$ to 85 g/$m^2$.

For the negative electrode 12c, the case 11 and the safety valve 13, members that generally are used for alkaline storage batteries can be used. For example, a negative electrode containing a hydrogen absorbing alloy or cadmium hydroxide as a negative electrode component can be used for the negative electrode 12c.

In the alkaline storage battery 10 of the first embodiment, since the separator 12a retains at least 15 mg/$cm^2$ of the electrolyte at least in the period P, a sufficient amount of the electrolyte is retained in the separator even after a number of cycles. Thus, in the alkaline storage battery 10, it is possible to suppress the deposition of the conductive material such as cobalt oxyhydroxide on the separator 12a even after a number of charge-discharge cycles. Accordingly, the alkaline storage battery 10 can suppress the formation of the conductive path from the positive electrode 12b to the negative electrode 12c, so that an alkaline storage battery maintaining excellent self-discharge characteristics even after a number of charge-discharge cycles can be obtained.

Second Embodiment

In the second embodiment, another rectangular battery will be described as an example of the alkaline storage battery of the present invention. The same description as in the alkaline storage battery 10 described in the first embodiment will be omitted.

The alkaline storage battery of the second embodiment satisfies the relationship of Y/X≧20 at least in the period P, where X (cm$^2$) is a total area of the separator 12a and Y (mg) is an amount of the electrolyte in the case. The amount of the electrolyte retained in the separator is not specifically limited here.

According to the alkaline storage battery of the second embodiment, since a sufficient amount of the electrolyte is retained in the separator even after cycles, an alkaline storage battery maintaining excellent self-discharge characteristics even after the charge-discharge cycles can be obtained.

Third Embodiment

In the third embodiment, another example of the alkaline storage battery of the present invention will be described.

Figure 3:
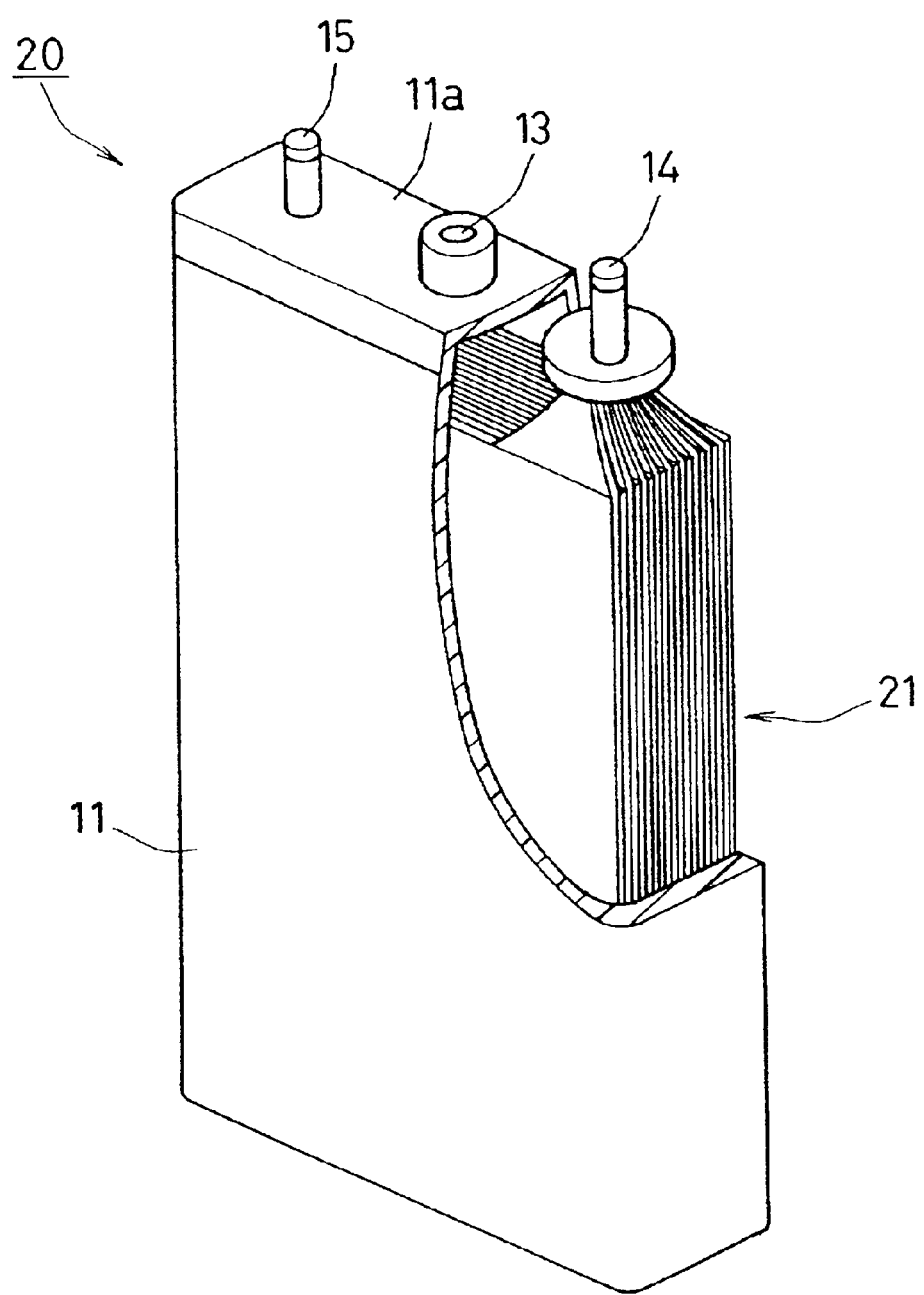
FIG. 3 is a partially exploded perspective view showing another example of the alkaline storage battery of the present invention.

Referring to FIG. 3, an alkaline storage battery 20 includes a case 11 provided with a lid 11a, an electrode group 21 and an electrolyte (not shown in the figure) that are enclosed in the case 11, a safety valve 13 provided in the lid 11a, and a positive electrode terminal 14 and a negative electrode terminal 15. As in the electrode group 12 shown in FIG. 2, the electrode group 21 has a structure in which a plurality of positive electrodes, each of which is inserted in a bag-like separator, and a plurality of negative electrodes are layered one on the other. The case, the separator and the positive electrode are the same as those described in the first embodiment, so the description thereof will be omitted.

In the alkaline storage battery 20, a chemical compound containing manganese (not shown in the figure) is deposited on the separator.

The electrolyte of the alkaline storage battery 20 is an alkaline solution in which KOH is dissolved. This electrolyte preferably contains manganese ion. Such manganese ion can be added to the electrolyte by dissolving manganese metal or a manganese compound.

The negative electrode of the alkaline storage battery 20 contains a hydrogen absorbing alloy as a main component. This hydrogen absorbing alloy preferably contains misch metal (Mm) and manganese in a composition ratio of 1:B, where 0.2≦B≦0.5.

In the alkaline storage battery 20 described above, a chemical compound containing manganese is deposited on the separator. This chemical compound has a lower electric conductivity than cobalt oxyhydroxide. Thus, even if a path of metal compound is formed from the positive electrode to the negative electrode, the path does not serve as a highly conductive path. Therefore, the alkaline storage battery of the third embodiment has excellent self-discharge characteristics.

EXAMPLES

In the following, the present invention will be described more specifically by way of examples.

EXAMPLE 1

Example 1 is directed to an example of rectangular alkaline storage batteries as shown in FIG. 1, which were produced using separators with different sulfonation degrees.

First, a paste of an active material for a positive electrode containing nickel hydroxide particles that formed a solid solution with cobalt was filled in a nickel foam, followed by drying and rolling, thus producing a positive electrode sheet. Then, this positive electrode sheet was cut into positive electrodes (positive electrodes 12b).

Next, a negative electrode paste containing a hydrogen absorbing alloy (whose composition was $MmNi_{3.55}Mn_{0.4}Al_{0.3}Co_{0.75}$) was applied to a perforated steel sheet (Fe/Ni plating), followed by drying and rolling, thus producing a negative electrode sheet. Then, this negative electrode sheet was cut into negative electrodes (negative electrodes 12c).

For a separator (separator 12a), a plurality of polypropylene separators with different sulfonation degrees were used. The separator was formed into a bag-like shape, and then the positive electrode was inserted therein. A plurality of the bag-like separators in which the positive electrodes were inserted and a plurality of the negative electrodes were layered so as to produce an electrode group (electrode group 12). This electrode group was inserted in a case (case 11). Thereafter, 20 g of an alkaline electrolyte prepared by dissolving lithium hydroxide in a concentration of 20 g/l in a potassium hydroxide solution having a specific gravity of 1.3 was poured in the case. Subsequently, the case was sealed with a lid provided with a safety valve. In this step, a positive electrode terminal and a negative electrode terminal respectively were connected to the positive electrodes and the negative electrodes with a lead. In this manner, the rectangular alkaline storage battery of Example 1 having a rated capacity of 6.5 Ah was produced.

As described above, in Example 1, a plurality of batteries were produced using separators with different sulfonation degrees. Then, the batteries were disassembled in the period P so as to measure the amounts of the electrolyte retained in the separators. This retained amount of the electrolyte was obtained from the difference between the measured weight of the separator just after disassembled and the re-measured weight of the same after being washed in water and dried.

The self-discharge rate after 200 cycles was measured with respect to each battery. In a cycle test, one cycle was constituted by charging at 13 A (2 C) for 30 minutes and discharging at 13 A (2 C) until a battery voltage reached 1 V. The self-discharge rate was measured in the following manner. The batteries subjected to 200 cycles were (1) charged until the state of charge (SOC) reached 60% (charged at a current value of 3.9 A for one hour from the discharge state), and (2) allowed to stand at 45° C. for one week. (3) A discharge capacity Y (Ah) was measured when the batteries were discharged at a current value of 2 A until the battery voltage reached 1 V, thus (4) calculating the self-discharge rate using a formula: Self-discharge rate (%)= (3.9−Y)/6.5×100.

Table 1 shows the relationship between the sulfonation degree of the separator, the amount of the electrolyte retained by the separator in the period P and the self-discharge rate after 200 cycles.

TABLE 1

| | S/C (×10$^{-3}$) | Amount of electrolyte retained in separator in the period P (mg/cm$^2$) | Self-discharge rate after 200 cycles (%) |
|---|---|---|---|
| Sample 1-1 | 1.5 | 12 | 23 |
| Sample 1-2 | 2.0 | 15 | 15 |

TABLE 1-continued

|  | S/C (x10$^{-3}$) | Amount of electrolyte retained in separator in the period P (mg/cm$^2$) | Self-discharge rate after 200 cycles (%) |
| --- | --- | --- | --- |
| Sample 1-3 | 2.5 | 17 | 15 |
| Sample 1-4 | 3.0 | 19 | 13 |
| Sample 1-5 | 3.5 | 19 | 12 |
| Sample 1-6 | 4.0 | 18 | 15 |
| Sample 1-7 | 4.5 | 18 | 15 |
| Sample 1-8 | 5.0 | 17 | 16 |
| Sample 1-9 | 5.5 | 18 | 16 |
| Sample 1-10 | 6.0 | 16 | 19 |

In Table 1, S/C is an index of the sulfonation degree, which is a value of (the number of sulfur atoms)/(the number of carbon atoms) in the separator. As becomes clear from Table 1, excellent self-discharge characteristics were achieved when the value of S/C was in the range of $2.0 \times 10^{-3}$ to $5.5 \times 10^{-3}$. In particular, still better self-discharge characteristics were achieved when the value of S/C was in the range of $3.0 \times 10^{-3}$ to $3.5 \times 10^{-3}$. In addition, by making the value of S/C equal to or smaller than $6.0 \times 10^{-3}$, it was possible to prevent the separator from being sulfonated excessively so as to harden the nonwoven fabric. Table 1 also shows that the electrolyte retention amount of the separator preferably was at least 15 mg/cm$^2$.

Example 2

Example 2 is directed to an example of the rectangular alkaline storage batteries, which were produced by changing the amounts of the electrolyte in the batteries.

In the alkaline storage batteries of Example 2, the same positive electrodes, negative electrodes and electrolytes as those in the alkaline storage batteries of Example 1 were used. A sulfonated separator with a S/C value of $3.0 \times 10^{-3}$ (the total area of the separator in the battery was 600 cm$^2$) was used for the separators. Then, the self-discharge rate after 200 cycles was measured while changing the amount of the electrolyte in the battery. The self-discharge rate was measured by the same method as described in Example 1. Table 2 shows the results of these measurements.

TABLE 2

|  | Amount of electrolyte (g/cell) | Amount of electrolyte per cm$^2$ of separator (mg) | Self-discharge rate after 200 cycles (%) |
| --- | --- | --- | --- |
| Sample 2-1 | 6 | 10 | 32 |
| Sample 2-2 | 8 | 12 | 30 |
| Sample 2-3 | 10 | 16 | 25 |
| Sample 2-4 | 12 | 20 | 19 |
| Sample 2-5 | 15 | 25 | 17 |
| Sample 2-6 | 20 | 33 | 14 |
| Sample 2-7 | 25 | 41 | 14 |
| Sample 2-8 | 30 | 50 | 14 |

As becomes clear from Table 2, by filling the electrolyte in an amount of at least 20 mg (preferably equal to or more than 30 mg) per cm$^2$ of the separator, the alkaline storage batteries having low self-discharge rate after 200 cycles were obtained.

Example 3

Example 3 is directed to an example of the rectangular alkaline storage batteries, which were produced by changing a pouring method.

In the alkaline storage batteries of Example 3, the same positive electrodes, negative electrodes, separators and electrolytes as those in the alkaline storage batteries of Example 2 were used. 20 g of the electrolytes were poured in the case by various pouring methods as in Table 3, thus producing the alkaline storage batteries. After pouring the electrolytes, the batteries were disassembled to measure the amount of the electrolyte retained in the separator. Furthermore, the self-discharge rate after 200 cycles was measured with respect to these batteries. The self-discharge rate was measured by the same method as described in Example 1. Table 3 shows the results of these measurements.

TABLE 3

|  | Pouring Method | Amount of electrolyte retained in separator in the period P (mg/cm$^2$) | Self-discharge rate after 200 cycles (%) |
| --- | --- | --- | --- |
| Sample 3-1 | Natural pouring | 7 | 30 |
| Sample 3-2 | Centrifugal pouring | 12 | 18 |
| Sample 3-3 | Drawing vacuum after pouring | 19 | 15 |
| Sample 3-4 | Pouring after drawing vacuum | 19 | 14 |

As becomes clear by Table 3, by drawing a vacuum after pouring the electrolyte or pouring it after drawing the vacuum, it was possible to wet the separator uniformly, thereby allowing the electrolyte to infiltrate the separator fabric sufficiently.

Example 4

Example 4 is directed to an example of the rectangular alkaline storage batteries, which were produced using separators with different specific surface areas.

In the alkaline storage batteries of Example 4, the same positive electrodes, negative electrodes and electrolytes as those in Example 2 were used. The electrolytes were poured in an amount of 20 g per cell.

Sulfonated separators with different specific surface areas (the total area of the separator was 600 cm$^2$) were used as the separators. Then, the alkaline storage batteries were produced by the same method as in Example 1. With respect to each battery, the self-discharge rate after 200 cycles was measured by the same method as in Example 1. Table 4 shows the results of these measurements.

TABLE 4

|  | Specific surface area (m$^2$/g) | Self-discharge rate after 200 cycles (%) |
| --- | --- | --- |
| Sample 4-1 | 0.45 | 19 |
| Sample 4-2 | 0.60 | 15 |
| Sample 4-3 | 0.75 | 14 |
| Sample 4-4 | 0.90 | 15 |
| Sample 4-5 | 1.05 | 20 |

When the weight per unit area of the separator used in each sample was measured, it was 60 g/m$^2$ in Sample 4-1, 65 g/m$^2$ to 80 g/m$^2$ in Samples 4-2 to 4-4, and 84 g/m$^2$ in Sample 4-5 respectively.

As becomes clear from Table 4, better self-dischage characteristics were achieved when the separator had a specific surface area of 0.60 m²/g to 0.90 m²/g (a weight per unit area of 65 g/m² to 80 g/m²). On the other hand, the self-dischage characteristics deteriorated when using the separators having a weight per unit area of equal to or less than 60 g/m². In addition, the pore distribution in each sample was measured in the range of 0.1 μm to 360 μm with a mercury porosimeter. The result showed that the use of the separators having a median pore diameter on a volume basis of not larger than 30 μm achieved excellent self-discharge characteristics even after 200 cycles.

Example 5

Example 5 is directed to an example of the rectangular alkaline storage batteries with various compositions of the hydrogen absorbing alloy.

In the alkaline storage batteries of Example 5, the same positive electrodes and electrolytes as those in Example 1 were used. A sulfonated separator with a S/C value of 3.0×10⁻³ was used for the separators.

In Example 5, a plurality of the rectangular alkaline storage batteries were produced with the negative electrodes containing the hydrogen absorbing alloy with various compositions. Then, the self-discharge rate after 200 cycles was measured with respect to these batteries by the same method as in Example 1. Table 5 shows the results of these measurements.

TABLE 5

| | Composition of hydrogen absorbing alloy | Self-discharge rate after 200 cycles (%) |
| --- | --- | --- |
| Sample 5-1 | $MmNi_{4.0}Mn_{0.5}Al_{0.3}Co_{0.4}$ | 15 |
| Sample 5-2 | $MmNi_{3.55}Mn_{0.4}Al_{0.3}Co_{0.75}$ | 15 |
| Sample 5-3 | $MmNi_{4.1}Mn_{0.2}Al_{0.3}Co_{0.75}$ | 16 |
| Sample 5-4 | $MmNi_{3.85}Mn_{0.1}Al_{0.3}Co_{0.75}$ | 18 |
| Sample 5-5 | $MmNi_{3.95}Al_{0.3}Co_{0.75}$ | 40 |
| Sample 5-6 | $MmNi_{4.2}Al_{0.6}Co_{0.4}$ | 38 |

As becomes clear from Table 5, lower self-discharge rate after the cycles were achieved when the hydrogen absorbing alloy contained manganese (Mn). In particular, still lower self-discharge rates were achieved when the hydrogen absorbing alloy contained misch metal (Mm) and manganese in a composition ratio of 1:B, where $0.2 \leq B \leq 0.5$.

Next, the following experiment was carried out to examine chemical compounds deposited on a surface of the separators. First, hydrogen absorbing alloy powders having the same composition as the hydrogen absorbing alloys used for Samples 5-1 to 5-6 were enclosed in the separators, and dipped in the electrolytes at 65° C. for 14 days. Thereafter, the separators and the alloy powders were taken out from the electrolytes, and the electrolytes were allowed to stand for 14 days at room temperature. Then, powders that had been deposited in the electrolytes were collected so as to be subjected to an X-ray diffraction, an ICP emission spectrometry and a measurement of powder resistance. The results showed that, in the powders deposited from the hydrogen absorbing alloys of Samples 5-5 and 5-6, peaks of cobalt oxyhydroxide were observed. On the other hand, in the powders deposited from the hydrogen absorbing alloys of Samples 5-1 to 5-4, no peak of cobalt oxyhydroxide was observed. Although these powders were found to be chemical compounds containing manganese and cobalt, it was not possible to identify the chemical compounds.

The results of the powder resistance measurement of these powders showed that the electric conductivity of the powders of Samples 5-5 and 5-6 was larger than that of the powders of Samples 5-1 to 5-4 by two orders of magnitude. In addition, the deposits on the surface of the separators also were considered to be the same chemical compounds as the above powders. Thus, it was considered that, when the hydrogen absorbing alloy contained manganese, it was possible to suppress the deposition of cobalt oxyhydroxide having a high electric conductivity on the surface of the separator, so that the chemical compound of manganese and cobalt having a lower electric conductivity could be deposited preferentially.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A nickel metal-hydride battery for use in a hybrid electric vehicle, the battery comprising:

a case; and a positive electrode, a negative electrode, a separator and an electrolyte that are provided in the case;

wherein the separator present between the positive electrode and the negative electrode is composed of a single layer, a total area X (cm²) of the separator and an amount Y (mg) of the electrolyte in the case satisfy a relationship of Y/X≧41 in a period, after assembling the battery, from a time the separator is impregnated with the electrolyte to a time the battery is activated, and the separator is bag-like in shape and at least one of the positive electrode and the negative electrode is inserted in the separator.

2. The alkaline storage battery according to claim 1 wherein an amount of the electrolyte retained in the separator is at least 15 mg/cm² in a period, after assembling the battery, from a time the separator is impregnated with the electrolyte to a time the battery is activated.

3. The alkaline storage battery according to claim 1, wherein the separator is formed of sulfonated polypropylene, and sulfur atoms and carbon atoms in the separator satisfy a relationship of (the number of the sulfur atoms)/(the number of the carbon atoms)=A, where $2.0 \times 10^{-3} \leq A \leq 5.5 \times 10^{-3}$.

4. The alkaline storage battery according to claim 1, wherein the electrolyte is poured into the case in a vacuum atmosphere.

5. The alkaline storage battery according to claim 1, wherein the separator has a specific surface area ranging from 0.6 m²/g to 0.9 m²/g.

6. The alkaline storage battery according to claim 1, wherein the separator has a median pore diameter of not larger than 30 μm on a volume basis when pores are measured in a range of 0.1 μm to 360 μm with a mercury porosimeter.

7. The alkaline storage battery according to claim 1, wherein the separator has a weight per unit area ranging from 60 g/m² to 85 g/m².

8. The alkaline storage battery according to claim 1, wherein the separator is formed of sulfonated polypropylene, and sulfur atoms and carbon atoms in the separator satisfy a relationship of (the number of the sulfur atoms)/(the number of the carbon atoms)=A, where $2.0 \times 10^{-3} \leq A \leq 5.5 \times 10^{-3}$.

9. The alkaline storage battery according to claim 1, wherein the electrolyte is poured into the case in a vacuum atmosphere.

10. The alkaline storage battery according to claim 1, wherein the separator has a specific surface area ranging from 0.6 m²/g to 0.9 m²/g.

11. The alkaline storage battery according to claim 1, wherein the separator has a median pore diameter of not larger than 30 μm on a volume basis when pores are measured in a range of 0.1 μm to 360 μm with a mercury porosimeter.

12. The alkaline storage battery according to claim 1, wherein the separator has a weight per unit area ranging from 60 g/m² to 85 g/m².

* * * * *

UNITED STATES PATENT AND TRADEMARK OFFICE
CERTIFICATE OF CORRECTION

PATENT NO. : 6,777,129 B2
DATED : August 17, 2004
INVENTOR(S) : Komori et al.

It is certified that error appears in the above-identified patent and that said Letters Patent is hereby corrected as shown below:

Title page,
Item [73], Assignee, "Tokyo Jidosha Kabushiki Kaisha" should read -- Toyota Jidosha Kabushiki Kaisha --.

Signed and Sealed this

Twentieth Day of December, 2005

JON W. DUDAS
*Director of the United States Patent and Trademark Office*